US011975899B2

(12) United States Patent
Telschow et al.

(10) Patent No.: US 11,975,899 B2
(45) **Date of Patent: *May 7, 2024**

(54) SELECTIVELY OPENABLE CLOSURE FOR A CONTAINER

(71) Applicant: Berry Global, Inc., Evansville, IN (US)

(72) Inventors: Samuel G. Telschow, Evansville, IN (US); Scott L. Fisher, Evansville, IN (US); Kelsey Coffey, Evansville, IN (US)

(73) Assignee: Berry Global, Inc., Evansville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/891,524

(22) Filed: Aug. 19, 2022

(65) Prior Publication Data

US 2022/0388742 A1 Dec. 8, 2022

Related U.S. Application Data

(63) Continuation of application No. 17/315,920, filed on May 10, 2021, now Pat. No. 11,453,535.

(60) Provisional application No. 63/021,959, filed on May 8, 2020.

(51) Int. Cl.

| | |
|---|---|
| ***B65D 50/06*** | (2006.01) |
| ***B05B 11/00*** | (2023.01) |
| ***B05B 11/10*** | (2023.01) |

(52) U.S. Cl.
CPC ........ *B65D 50/061* (2013.01); *B05B 11/0037* (2013.01); *B05B 11/1059* (2023.01)

(58) Field of Classification Search
CPC .............. B65D 50/061; B05B 11/0037; B05B 11/1059; B05B 11/1047; B05B 11/0032
See application file for complete search history.

(56) References Cited

U.S. PATENT DOCUMENTS

| | | | |
|---|---|---|---|
| 5,615,806 | A | 4/1997 | Grothoff |
| 2008/0083784 | A1 | 4/2008 | Foster et al. |
| 2011/0174840 | A1 | 7/2011 | Law et al. |

FOREIGN PATENT DOCUMENTS

| | | | |
|---|---|---|---|
| CN | 106882474 | A | 6/2017 |
| EP | 1486261 | A1 | 12/2004 |

OTHER PUBLICATIONS

International Search Report and Written Opinion of corresponding International Application No. PCT/US2021/031556 dated Aug. 13, 2021, all enclosed pages cited.

*Primary Examiner* — Vishal Pancholi

(57) ABSTRACT

A closure for a container, and more specifically a closure that is selectively openable and/or lockable providing, for example, one or more child resistant opening features is disclosed.

14 Claims, 8 Drawing Sheets

SELECTIVELY OPENABLE CLOSURE FOR A CONTAINER

PRIORITY CLAIM

This application is a continuation of U.S. application Ser. No. 17/315,920, filed May 10, 2021, which claims priority under 35 U.S.C. § 119(e) to U.S. Provisional Application Ser. No. 63/021,959, filed May 8, 2020, each of which is expressly incorporated by reference herein.

TECHNICAL FIELD

The present disclosure relates generally to a closure for a container, and more specifically to a closure that is selectively openable and/or lockable providing, for example, one or more child resistant opening features.

BACKGROUND

It is often desirable to make a container selectively openable by providing a closure for the container. For example, the closure may be selectively opened and closed and may include a locking or blocking feature that makes it more difficult or resistant to opening by a child. The closure may be movable between a locked position in which it is difficult for it to be opened relative to the container, and an unlocked position in which it is removable from the container.

SUMMARY

Certain embodiments according to the present disclosure provide a selectively openable closure for a container. The closure may be movable between a closed position in which it blocks access to a pump or container, and an open position in which it allows access to a pump or container. The closure may be movable between an unlocked position in which it may be moved between the open and closed positions, and a locked position, in which it cannot be moved from the closed position to an open position.

In one aspect, for instance, a package is provided having a container having a side wall and a bottom, the side wall and bottom at least partially defining a product storage region. A pump is configured to dispense product from the product storage region, the pump extending away from the container bottom in a first direction from a pump inlet to a dispensing outlet. A closure is configured to cooperate with the container to enclose the pump, the closure having a cover and a side wall blocking access to the pump when the closure is in a closed position. The closure side wall depends axially from the closure cover, the closure cover and closure side wall define a closure interior, and the pump extends in the first direction into the closure interior when the closure is in the closed position. A collar is disposed circumferentially around the pump and disposed axially between the dispensing outlet and the container bottom. The closure includes at least one locking tab and the collar includes at least one blocking tab and at least one slot. The at least one slot is configured to allow axial movement of the at least one locking tab through it when the closure is in an unlocked position and the at least one blocking tab is configured to block axial movement of the at least one locking tab past it in the first direction when the closure is in a locked position. The closure is movable by a first user input between the locked position and the unlocked position. The closure is movable in the first direction by a second user input from the closed position to an open position when the closure is in the unlocked position, and movement of the closure by the second user input from the closed position to the open position is substantially blocked when in the locked position.

In another aspect, for instance, a package is provided having a container having a side wall and a bottom, the side wall and bottom at least partially defining a product storage region. A closure is configured to cooperate with the container to enclose the product storage region, the closure having a cover and a side wall blocking access to the product storage region when the closure is in a closed position. The closure side wall depends axially from the closure cover, and the closure cover and closure side wall cooperate to define a closure interior. A collar is coupled to the container and disposed between the container side wall and the closure side wall when the closure is in the closed position. The closure includes a first locking tab and a second locking tab. The collar includes at least one blocking tab, a first slot, and a second slot, wherein the first slot is configured to allow axial movement of the first locking tab through it in a first direction and the second slot is configured to allow axial movement of the second locking through it in the first direction when the closure is in an unlocked position. The at least one blocking tab is configured to block axial movement of the first locking tab and the second locking tab past it in the first direction when the closure is in a locked position. The closure is movable by a first user input between the locked position and the unlocked position. The closure is movable by a second user input in the first direction from the closed position to an open position when the closure is in the unlocked position, and movement of the closure by the second user input from the closed position to the open position is substantially blocked when in the locked position.

In yet another aspect, for instance, a child resistant pump closure combination is provided having a pump configured to dispense product through a dispensing outlet, the pump extending axially in a first direction from a pump inlet to a dispensing outlet. The pump including a push button configured to be actuated by a user to dispense product through the pump and the dispensing outlet. A closure is configured to enclose the pump, the closure having a cover and a side wall blocking access to the pump when the closure is in a closed position. The closure side wall depends axially from the closure cover in a second direction opposite the first direction, the closure cover and closure side wall define a closure interior, and the pump extends in the first direction into the closure interior when the closure is in the closed position. A collar disposed circumferentially around the pump and disposed axially below the dispensing outlet in the second direction away from the closure cover when the closure is in the closed position. The closure includes a first locking tab and a second locking tab. The collar includes at least one blocking tab, a first slot, and a second slot, wherein the first slot is configured to allow axial movement of the first locking tab through it in the first direction and the second slot is configured to allow axial movement of the second locking through it in the first direction when the closure is in an unlocked position. The at least one blocking tab is configured to block axial movement of the first locking tab and the second locking tab past it in the first direction when the closure is in a locked position. The closure is movable by a first user input between the locked position and the unlocked position. The closure is movable by a second user input in the first direction from the closed position to an open position when the closure is in the unlocked position, and movement of the closure by the second user input from the closed position to the open position is substantially blocked when in the locked position.

BRIEF DESCRIPTION OF THE DRAWINGS

The detailed description particularly refers to the accompanying figures, in which.

DETAILED DESCRIPTION

Embodiments now will be described more fully hereinafter with reference to the accompanying drawings, in which some, but not all embodiments are shown. As used in the specification, and in the appended claims, the singular forms "a", "an", "the", include plural referents unless the context clearly dictates otherwise.

The terms "substantial" or "substantially" may encompass the whole as specified, according to certain embodiments, or largely but not the whole specified according to other embodiments.

Figure 1:
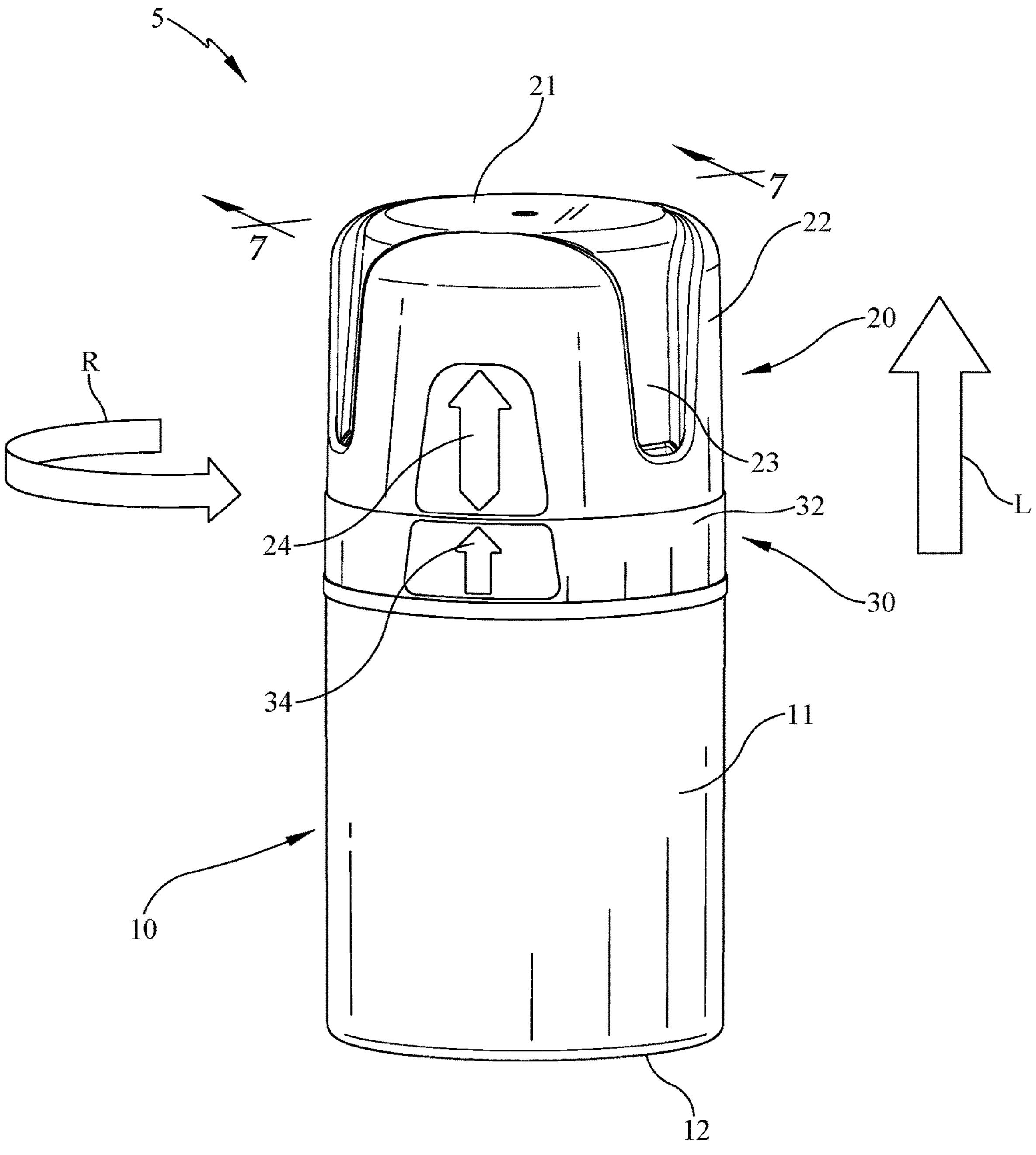
FIG. 1 illustrates a perspective view of an exemplary embodiment of a package that includes a container and a child-resistant closure in a closed position and an unlocked position.
Figure 7:
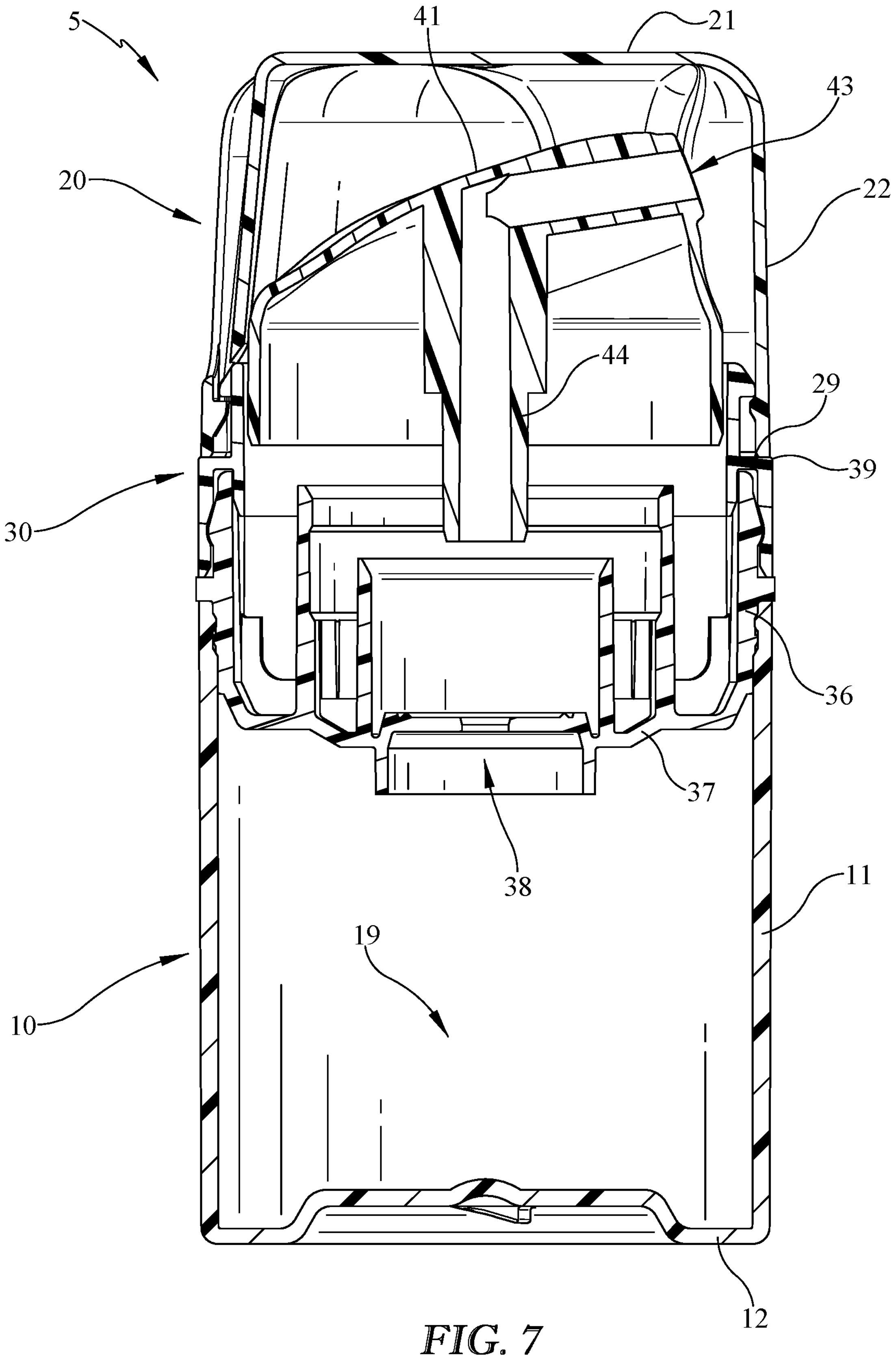
FIG. 7 illustrates a cross-section view of the package of FIG. 1.

Some embodiments of a package 5 such as shown in FIG. 1 may include a container or bottle 10 and a closure 20. If included, container 10 may include a side wall 11 and/or a bottom 12, which may substantially define a product storage region 19 in container 10 (product storage region 19 is shown in FIG. 7). Package 5 is shown in FIG. 1 in an exemplary closed position with closure 20 attached, coupled, and/or fastened to a collar 30 that in turn is attached, coupled, and/or fastened to container 10, such that closure 20 is blocking access to product storage region 19. For example, closure 20 may snap or fit on to collar 30, and/or collar 30 may snap on, screw on, be bonded to, and/or be integral with container 10. Closure 20 may be configured so that a user may selectively open package 5 and/or remove closure 20 from collar 30 and/or container 10 to provide package 5 in an open position so that, for example, the user may access contents of container 10 and/or package 5 stored in product storage region 19. In some embodiments for example, a pump 40 may be included to dispense contents from product storage region 19 or for any other reason or combination of reasons. Pump 40 may be used to dispense, for example, creams, lotions, fluids, or the like. Closure 20 may be provided such that a user may selectively reclose container 10 and/or package 5 by reclosing, reconnecting, or reattaching closure 20 to collar 30 and/or container 10. It is understood that collar 30 may be formed substantially integral with container 10 and/or closure 20 may attach and/or couple to container 10 with or without collar 30.

Closure 20 may rotate relative to collar 30 and/or container 10 by a first user input, for example as indicated by a rotation R, between a locked position in which opening and/or removing closure 20 is blocked, prevented, and/or inhibited, and an unlocked position in which such opening and/or removing of closure 20 is permitted, such as is shown for example in FIG. 1 by lift L. Closure 20 may be moved from a closed position with a cover 21 blocking access to the contents of container 10 as shown for example in FIG. 1, to an open position by a second user input such as lift L. In the open position, closure 20 may be moved or removed relative to collar 30 and/or container 10, as shown for example in FIG. 2. In the open position, and/or with closure 20 removed, a dispenser may be accessible by a user, such as for example a pump 40 and/or a dispensing outlet 43. A user may be push, depress, and/or actuate pump 40 to dispense contents of product storage region 19, for example, by a third user input such as pushing on a push button 41 located at or near a top end of pump 40.

As shown in FIG. 1, closure 20 may include an unlocking or alignment indicia 24 and/or collar 30 or container 10 may include an unlocking or alignment indicia 34. For example, when closure alignment indicia 24 and collar alignment indicia 34 are aligned as shown in FIG. 1, this may indicate that closure 20 is in the unlocked position. When closure alignment indicia 24 and collar alignment indicia 34 are substantially out of alignment, this may indicate that closure 20 is in the locked position. Closure alignment indicia 24 may be located on an external area of closure 20, such as closure side wall 22, and/or collar alignment indicia 34 may be located on an external area of collar 30, such as collar side wall 32.

Figure 2:
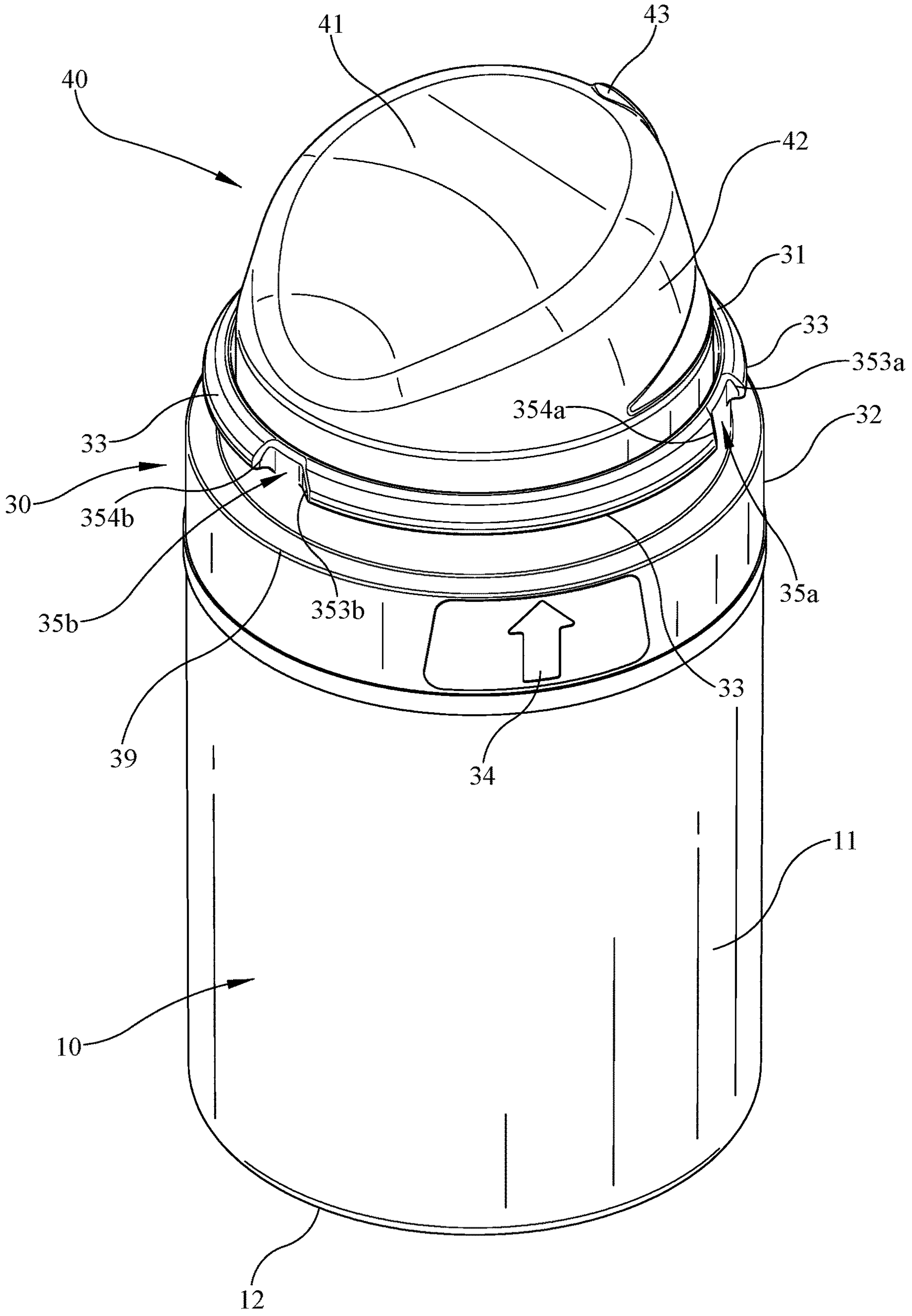
FIG. 2 illustrates a perspective view of a portion of the package of FIG. 1, shown without the closure to show a pump and a collar in more detail.
Figure 3:
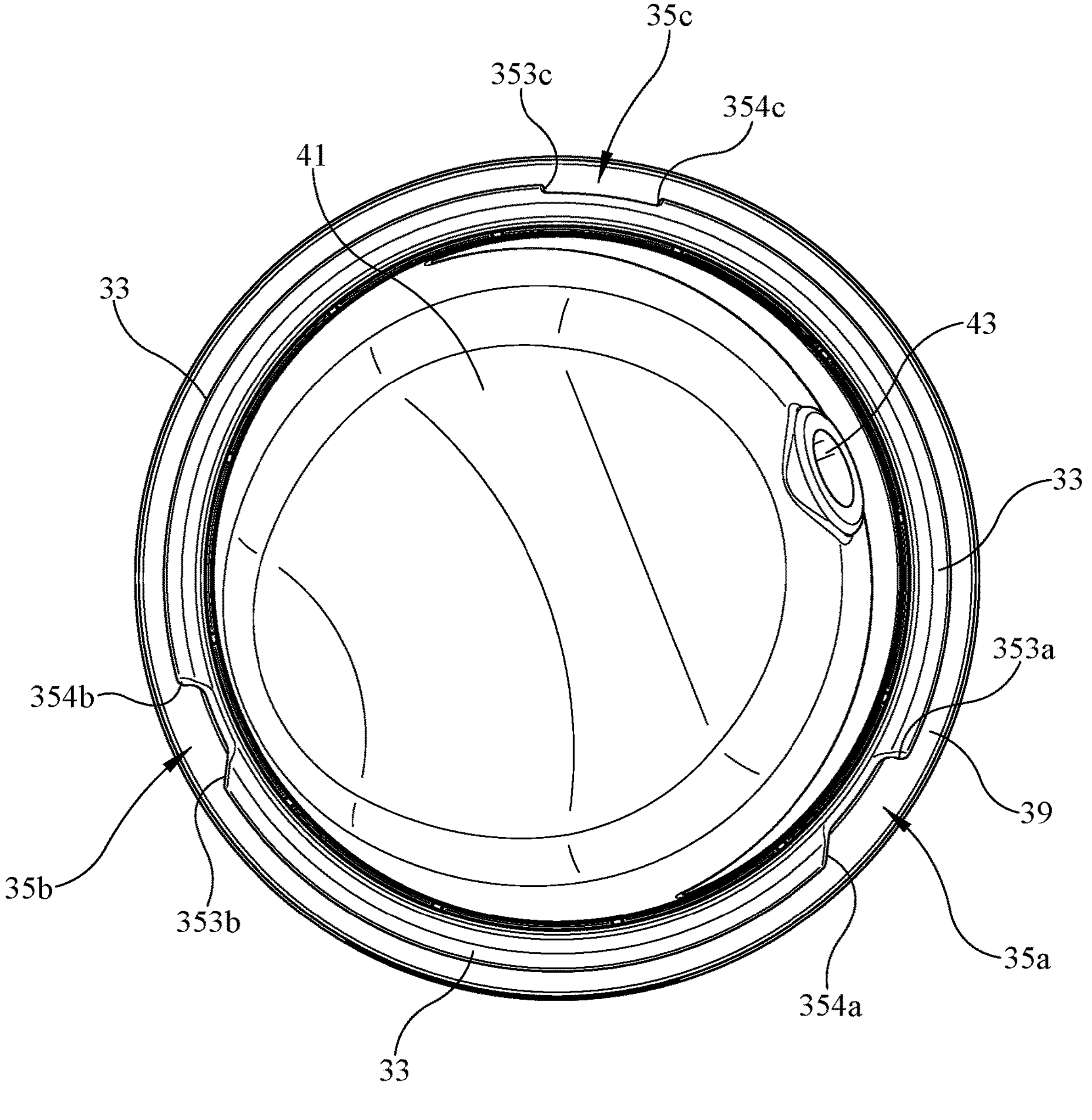
FIG. 3 illustrates a top view of the portion of the package shown in FIG. 2.

Closure 20 may include one or more locking features that may cooperate with one or more locking features of collar 30 and/or container 10 to block, prevent, or inhibit opening of and/or removal of closure 20 from collar 30 and/or container 10. For example, as shown in FIGS. 2 and 3, collar 30 may include one or more blocking tabs 33 separated from one another by one or more opening slots 35*a*, 35*b*, and/or 35*c*. One or more slots 35*a*, 35*b*, and/or 35*c* may be referred to collectively herein as slots 35. It is understood that there may be a plurality of blocking tabs 33 or there may be one or more blocking tabs 33 with gaps, breaks, or discontinuities provided by one or more slots 35.

Figure 4:
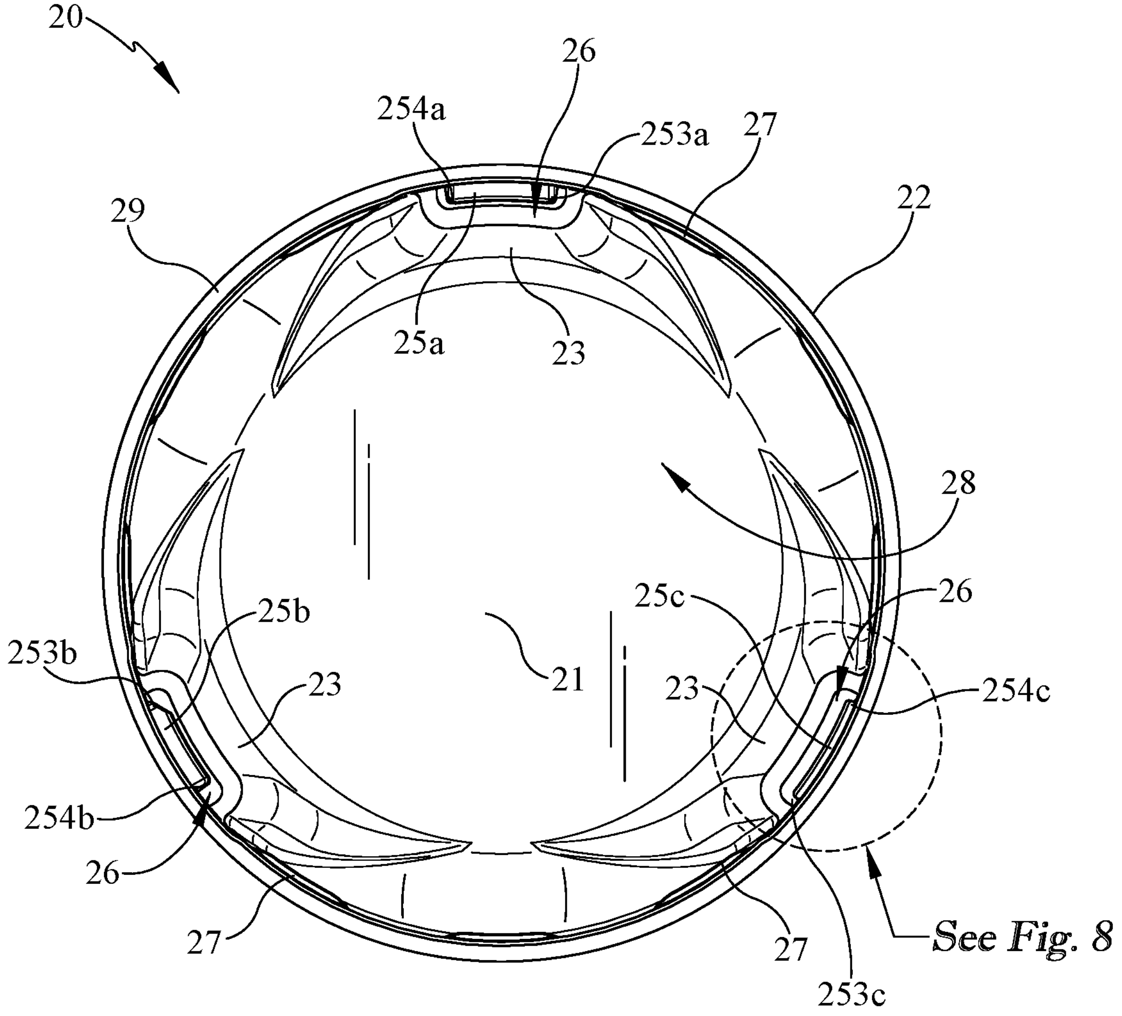
FIG. 4 illustrates a bottom view of the closure of FIG. 1.
Figure 5:
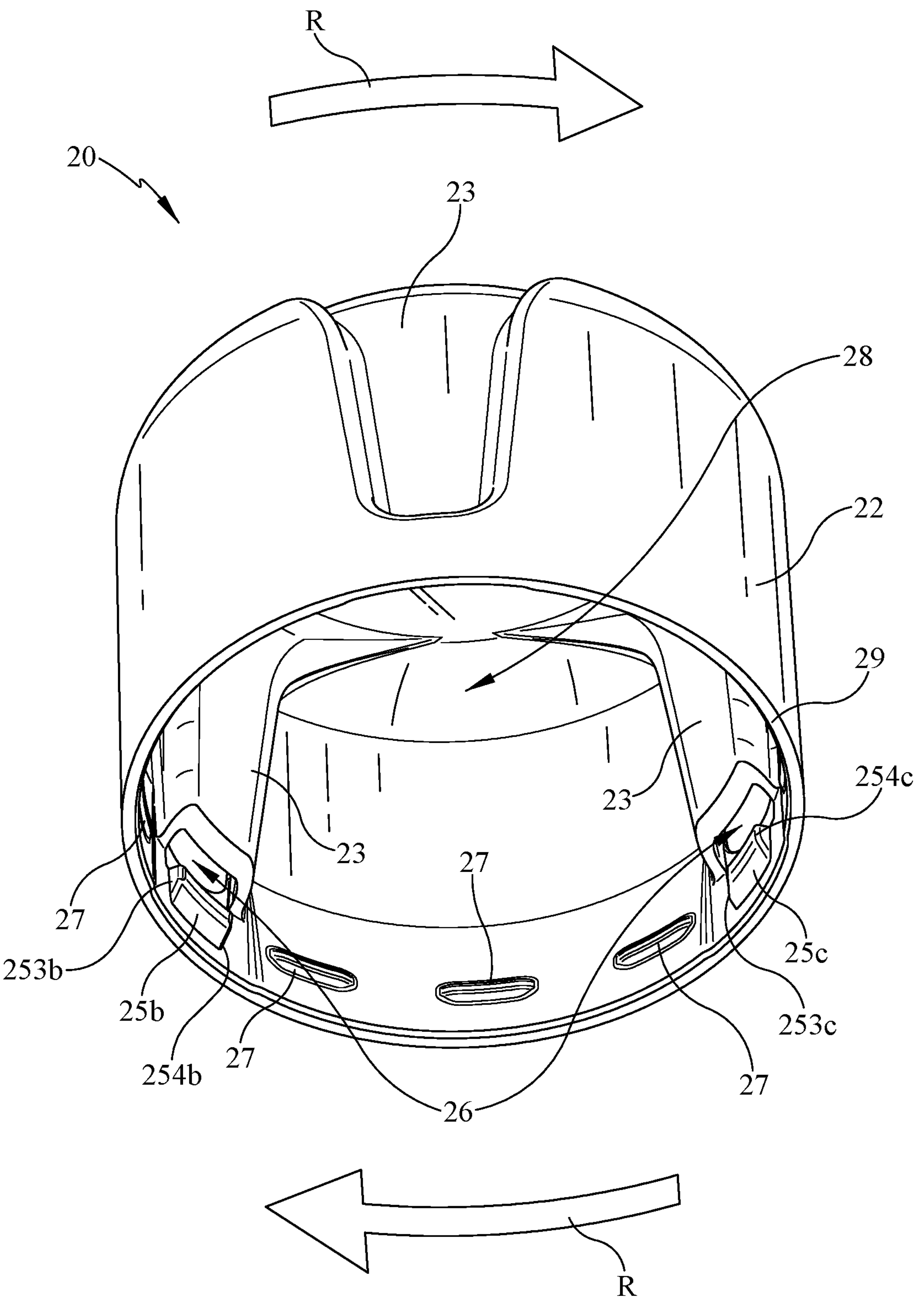
FIG. 5 illustrates a bottom perspective view of the closure of FIG. 4.

As shown in FIGS. 4 and 5, closure 20 may include one or more locking tabs 25*a*, 25*b*, and/or 25*c*, which may extend radially inwardly from a closure side wall 22. One or more locking tabs 25*a*, 25*b*, and/or 25*c* may be referred to collectively herein as locking tabs 25. In the locked position, closure locking tabs 25 may engage and/or may be in vertical alignment with blocking tabs 33 of collar 30 to prevent opening of closure 20 relative to collar 30. In the unlocked position, closure locking tabs 25 may be in alignment with opening slots 35 so that, for example, closure locking tabs 25 may slide or pass through opening slots 35 to allow or permit moving closure 20 to the open position in which pump 40 is accessible by a user, for example, to pump and/or dispense contents from container 10 via dispensing outlet 43. Alignment of closure locking tabs 25 with opening slots 35 may be indicated to a user, for example, by alignment of closure indicia 24 with collar indicia 34, which may cooperate to form an unlocked indicium.

As shown in FIGS. 3 and 4, within the plurality of locking tabs 25, varying characteristics may be provided on each tab 25*a*, 25*b*, 25*c*, such as a first or large tab 25*a*, a second or small tab 25*b*, and/or a third or narrow tab 25*c*, as discussed in more detail below. Within the plurality of opening slots 35, varying characteristics may be provided, such as a first or large opening slot 35*a*, a second or small opening slot 35*b*, and/or a third or narrow opening slot 35*c*, as discussed in more detail below. One or more of locking tabs 25 may include a feature configured to cooperate with a feature of a corresponding slot 35. For example, small tab 25*b* may have a geometric feature such as an angled tab corner at a leading edge 253*b*, which may be configured to pass through a similarly shaped feature of small slot 35*b*, such as an angled slot corner at a leading edge 353*b*. Closure side wall 22 may extend downwardly and/or in a second direction when closure 20 is in the closed position from one end adjacent cover 21 to an opposite end at or near a closure rim 29, and/or closure side wall 22 may extend upwardly and/or in a first direction when the closure is in the closed position from closure rim 29 toward cover 21.

As shown in FIGS. 2 and 3, pump 40 may include push button 41 at or near a top end, and/or a side wall 42 extending downwardly or in the second direction from the top or push button 41. A user may provide a third input, for example, pushing down on push button 41, to actuate pump 40 and/or push it downwardly or in the second direction relative to collar 30 and/or container 10, to pump and/or dispense contents through dispensing outlet 43. Collar 30 may have a rim 31 at or near a top edge, and/or a side wall 32 extending downwardly from the rim. Pump 40 and/or pump side wall 42 may move vertically through an opening in rim 31 so that pump 40 may move vertically between a resting position (e.g., up) and a dispensing position (e.g., down). Pump 40 may move vertically or axially (e.g., in the first direction and/or the second direction) to actuate a mechanical and/or vacuum style pumping mechanism, for example. Pump 40 may be biased toward the resting position when in the dispensing position. Pump 40 may move vertically and/or slide vertically relative to collar 30 between the resting position and the dispensing position. Pump 40 may extend vertically or axially in the first direction from an opening or inlet 38 toward dispensing outlet 43 and/or in the opposite or second direction. The first direction and/or the second direction may be substantially parallel or collinear with any or all of axes of container 10, closure 20, collar 30, and/or pump 40 when closure 20 is in the closed position, and/or any or all of axes of container 10, closure 20, collar 30, and/or pump 40 may be substantially coaxial when closure 20 is in the closed position, as shown for example in FIG. 1. It is understood that any or all axes, if included, could be oriented other than coaxially, colinearly, and/or parallel.

In some embodiments, such as shown in FIG. 2, collar 30 may include a shoulder 39 in side wall 32 for any of a variety of reasons. For example, shoulder 39 may provide a radial step in side wall 32 to provide blocking tabs 33 and opening slots 35 radially inwardly of a lower section of side wall 32. This configuration may allow closure locking tabs 25 to extend radially inwardly of closure skirt 22 and engage collar blocking tabs 33, which may extend radially outwardly from an upper portion of collar side wall 32, while maintaining a substantially flush, smooth, and/or continuous outer periphery or surface of the outsides of closure 20, collar 30, and/or container 10. It is understood that, in some embodiments, collar 30 may be a separate piece that is coupled and/or attached to container 10, collar 30 may be permanently and/or semi-permanently attached and/or coupled to container 10, and/or collar 30 may be formed integrally and/or as a substantially single piece with container 10. For example, collar 30 may include one or more beads 36*a* that may provide or facilitate a snap fit or friction fit with container 10 and/or container side wall 11.

A bottom view of closure 20 is shown in FIG. 4. One or more flutes 23 may extend along and/or adjacent closure side wall 22 in the second direction from cover 21 to an opposite bottom end of side wall 22. Flutes 23 may terminate at a lower end that is above a lower end of the side wall 22, which may provide a continuous periphery at the lower end of side wall 22, for example. Locking tabs 25 may extend radially inwardly from side wall 22. One or more closure beads 27 may extend radially inwardly from side wall 22 for any of a variety of reasons, including but not limited to, providing a snap fit with collar 30 and/or container 10. To allow a user to overcome the fit between closure 20 and collar 30, beads 27 may extend radially inwardly a distance less than locking tabs 25 to facilitate and/or permit a user to open package 5 by removing closure 20 from collar 30 and/or container 10 while closure 20 is in the unlocked position. For example, a second user input such as lift L may move closure 20 from the closed position (see, e.g., FIG. 1) to the open position (see, e.g., FIG. 2). While virtually any shape, size, orientation, and/or configuration of locking tabs 25, tab openings 26, and/or flutes 23 may be used, in some embodiments three equally spaced flutes 23, with three equally spaced locking tabs 25 and three equally spaced tab openings 26, may be used as shown for example in FIG. 5. For example, locking tabs 25, tab openings 26, and/or flutes 23 may be angularly spaced equally and/or, in embodiments including three locking tabs 25, may be angularly spaced apart at intervals of approximately 120 degrees.

Flutes 23 may be disposed radially inwardly of closure skirt 22, for example, to provide molding access to locking tabs 25 and/or to provide one or more tab openings 26, as shown for example in FIG. 5. Flutes 23 may be disposed radially inwardly of closure side wall 22 to provide tab openings 26 substantially in vertical alignment with locking tabs 25 for any of a variety of reasons. For example, flutes 23 may provide grip for a user to provide a first or unlocking input, for example, rotating closure 20 relative to collar 30 and/or container 10, and/or flutes 23 may provide a radial displacement relative to side wall 22 so that tab opening 26 may extend radially to provide a mold release location to facilitate manufacture of closure 20.

Closure 20 may include an interior 28 at least partially defined by cover 21 and side walls 22, as shown for example in FIG. 5. Closure interior 28 may extend in a vertical or axial direction, such as in the first direction from closure rim 29 upwardly to cover 21, or in the opposite or second direction, to provide a recess, cavity, and/or region into which pump 40 may extend when closure 20 and/or package 5 is in the closed position.

Figure 6:
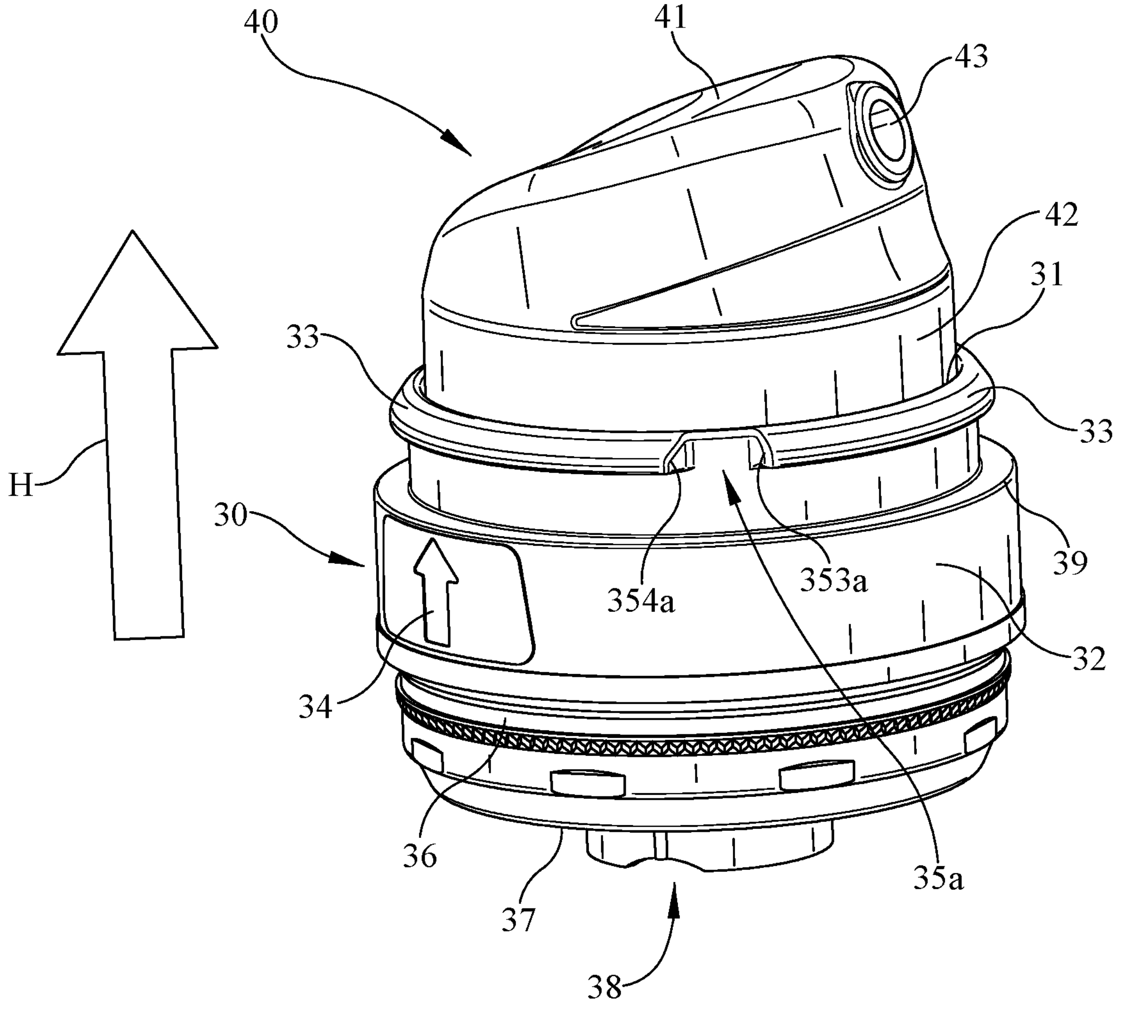
FIG. 6 illustrates the pump and collar of FIG. 2, shown without the closure or a container.

As shown in FIG. 6, collar 30 and/or pump 40 may extend in a vertical or axial direction, such as the first direction, as indicated by height H, for example. Collar 30 may be configured to attach, engage, and/or couple with container 10 by an attachment mechanism such as collar beads 36*a* that may be included on a lower collar portion 36. For example, lower collar portion 36 may include one or more beads 36*a*, and/or bonding or coupling mechanisms to couple to container 10. Lower collar portion 36 may include a floor 37, which may for example be provided to provide a lower floor of pump 40 and/or to prevent pump 40 from being pushed downwardly too far and/or falling into container 10. Height H may relate to a distance pump 40, and/or a portion of collar 30 at or above shoulder 29, extends. Closure interior 28, side wall 22, and/or flutes 23 may be configured to provide enough space to accommodate pump 40, collar 30, and/or height H, for example.

FIG. 7 illustrates a cross-section view of package 5. Pump 40 may include an inlet tube 44 that may extend toward and/or partially into or through collar 30, for example toward opening or inlet 38 in collar 30. Contents from product storage region 19 may be dispensed via collar opening 38, inlet tube 44, and/or dispensing outlet 43 for use by a consumer, for example. Any or all of pump 40, collar 30, and closure 20 may cooperate to provide a child resistant pump closure combination, such as is shown in FIG. 7. The child resistant pump closure combination may cooperate with container 10 to form package 5.

Referring again to FIGS. 4 and 5, closure 20 is illustrated having locking tabs 25 of varying characteristics, including first locking tab **25*a*, second locking tab 25*b*, and third locking tab 25*c*. While it is understood that one or more locking tabs 25 may be similar, in some embodiments a variety of locking tabs 25 may be provided for any of av variety of reasons such as, for example, a large tab 25*a*, a small tab 25*b*, and a narrow tab 25*b*. For example, large tab 25*a* may be configured to pass through first or large opening slot 35*a* in collar 30 and/or container 10, and/or configured so that it will not pass through second or small opening slot 35*b* and/or third or narrow opening slot 35*c*. In this way, for example, closure 20 may be configured to open relative to collar 30 and/or container 10 from a fewer number of positions such as a single unlocked position for example, which may be indicated by alignment of closure indicia 24 and collar indicia 34**.

For example, as shown in FIG. 4, large tab **25*a* may extend in a circumferential direction from a first end or leading edge 253*a* to a second end or trailing edge 254*a* a sufficient length such that leading edge 253*a* and trailing edge 254*a* are spaced apart far enough so that one or both edges 253*a*, 254*a* will engage blocking tab 33 except when aligned with large opening slot 35*a*. Large opening slot 35*a* may be sized to have a circumferential length from leading edge 353*a* to trailing edge 354*a* to allow large tab 25*a* to pass through it vertically, axially, and/or in the first direction. As shown in FIGS. 3 and 4, large tab 25*a* may be of sufficient circumferential length that it will not easily pass vertically through small opening slot 35*b*, which may have a smaller circumferential length from a leading edge 353*b* to a trailing edge 354*b*. Second tab 25*b* may have a circumferential length from a leading edge 253*a* to a trailing edge 254*b*, and/or a radial width, such that second tab 25*b* may pass axially or vertically through second slot 35*b* in the first direction. Third tab 25*c* may have a circumferential length from a leading edge 253*c* to a trailing edge 254*c*, and/or a radial width, such that third tab 25*c* may pass axially or vertically through third slot 35*c*** in the first direction.

Instead of or in addition to being circumferentially sized to pass or not pass through a given opening slot 35, one or more locking tabs 25, such as large tab **25*a* and/or small tab 25*b* for example, may be sized in a radial direction with a sufficient radial width to not pass through an opening slot 35 with a smaller radial dimension or width, such as narrow opening slot 35*c*, for example. In this way, for example as shown in FIGS. 3 and 4, large tab 25*a* and small tab 25*b* may be configured to not pass easily through narrow opening slot 35*c*. Narrow tab 25*c* may be of sufficiently small radial width or dimension that it could pass through small opening slot 35*b* in that respect, but of sufficiently large circumferential length that it will not easily pass through small opening slot 35*b*. By varying dimensions circumferentially (length) and/or radially (width), for example, certain locking tabs 25 may be configured to pass through one, some, or all opening slots 35. It is understood that any or all locking tabs 25** could vary over their length, width, and/or depth, for example, with varying or non-uniform shape and/or with gaps, breaks, slots, discontinuities and/or hollow or open areas within them.

In some embodiments of closure 20 and collar 30, first tab **25*a* may be sized, shaped, and/or configured to pass through first slot 35*a* but not second slot 35*b* or third slot 35*c* in the first direction, while second tab 25*b* may be sized shaped, and/or configured to pass through second slot 35*b* but not first slot 35*a* or third slot 35*c*, and third tab 25*c* may be sized shaped, and/or configured to pass through third slot 35*c* but not first slot 35*a* or second slot 35*b*, as shown for example in FIGS. 3 and 4. For example, first tab 25*a* may be too long, and/or may have an incompatible shape, such that it cannot pass through second slot 35*b*. Continuing this example, second slot 35*b* may have a sufficiently angled leading edge 353*b* while first tab 35*a* has a less angled leading edge 253*a* such that leading edge 253*a* of first tab 25*a* could not pass through the angled leading edge 353*b* of second slot 35*b*. First tab 25*a* may have a radial dimension or width that is too large to pass through a smaller radial dimension of or width of third slot 35*c*. In this example, first tab 25*a* could pass through first slot 35*a*, but not through second slot 35*b* or third slot 35*c*. Second tab 25*b* may have a width that is greater than a width of third slot 35*a* and/or third slot 35*c* such that second tab 25*b* may pass through second tab 35*b* but not first slot 35*a* or third slot 35*c*. Third tab 25*c* may have a length that is greater than a length of first slot 35*a* and/or second slot 35*b* such that third tab 25*c* may pass through third slot 35*c*, having a greater length from a leading edge 353*c* to a trailing edge 354*c* than the length of third tab 25*c*, but not first slot 35*a* or second slot 35*b***.

A gap, break, or discontinuity may be provided in bead 27, as shown for example in FIG. 5, for any of a variety of reasons, including but not limited to, facilitating removal of closure 20 from collar 30. For example, as a user provides lift L with emphasis at the location of closure indicia 24, collar 20 may rotate slightly relative to collar 30 and/or container 10 in addition to moving vertically relative thereto (e.g., in a case where a user may push up by finger or thumb at closure indicia 24 from the unlocked position). Narrow locking tab **25*c* may be provided opposite closure indicia 24 to provide and/or facilitate some hinging or hinge-like motion nearby with collar 30. Continuing an example where a user may push up at closure indicia 24, narrow tab 25*c* may be narrower than other blocking tabs 25*b*, 25*c* in a radial direction to avoid or minimize interference with blocking tab 33 when opening closure 20** from the unlocked position.

Figure 8:
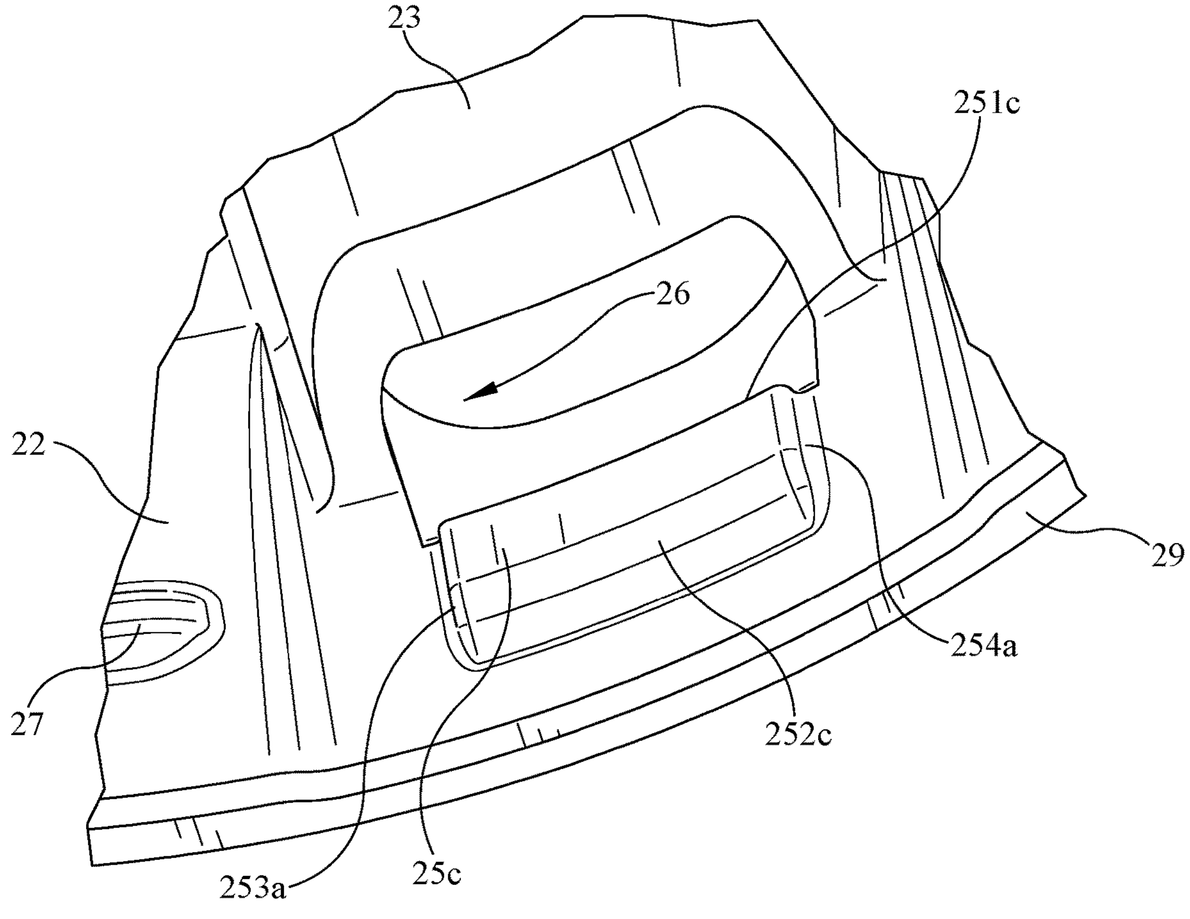
FIG. 8 illustrates a close up perspective view of a portion of the closure of FIG. 4, showing an embodiment of a locking tab in more detail.

Narrow tab **25*c* may include a rounded, chamfered, beveled, tapered and/or cam lower edge 252*c* and/or a relatively flat or horizontal upper edge 251*c* as shown for example in FIG. 8. Lower edge 252*c* may facilitate attachment and/or coupling of closure 20 to collar 30 and/or container 10, for example, when closure 20 is applied in the second direction onto collar 30, by providing a more gradually tapered or cam surface relative to upper edge 251*c*. Upper edge 251*c* may provide additional closure security and/or secure engagement of closure 20 to collar 30 and/or container 10, for example, by providing a mechanical stop when a user attempts to move closure 20 in the first direction while closure 20 is in the closed and locked positions. Although not shown, either or both of first tab 25*a* and second tab 25*b* could include a relatively flat upper edge and/or a relatively rounded, chamfered, beveled, tapered, and/or cam lower edge instead of or in addition to including such features on third or narrow tab 25***c*. Locking tabs 25 may vary in characteristics, such as the geometry shown and described above with or without varying the characteristics and/or geometry of other features, such as flutes 23. For example, locking tabs 25*a*, 25*b*, and 25*c* may be provided with varying geometry while corresponding flutes 23 are provided with substantially similar geometry to one another for any of a variety of reasons, including but not limited to providing a more uniform aesthetic.

It is understood that package 5 and/or any component thereof may be made of any of a variety of materials, including, but not limited to, any of a variety of suitable plastics material, any other material, or any combination thereof. Suitable plastics material may include, but is not limited to, polyethylene terephthalate (PET), polyethylene (PE), polypropylene (PP), polystyrene (PS), high-density polyethylene (HDPE), low-density polyethylene (LDPE), linear low-density polyethylene (LLDPE), crystallized polyethylene terephthalate (CPET), mixtures and combinations thereof, or any other plastics material or any mixtures and combinations thereof. It is understood that multiple layers of material may be used for any of a variety of reasons, including to improve barrier properties, or to provide known functions related to multiple layer structures. The multiple layers, if included, may be of various materials, including but not limited to those recited herein.

It is further understood that package 5 or any component thereof may be substantially rigid, substantially flexible, a hybrid of rigid and flexible, or any combination of rigid, flexible, and/or hybrid, such as having some areas be flexible and some rigid. It is understood that these examples are merely illustrative, are not limiting, and are provided to illustrate the versatility of options available in various embodiments of package 5.

It is further understood that any of a variety of processes or combination thereof may be used to form package 5 and/or container 10, any component thereof, or any layer or substrate used therein. For example, any component, layer, or substrate, or combination thereof, may be thermoformed, injection molded, injection stretch blow molded, blow molded, extrusion blow molded, coextruded, subjected to any other suitable process, or subjected to any combination thereof. In some embodiments, container 10 and/or any component thereof may be formed substantially of injection stretch blow molded PET, although other materials and forming processes may be used instead of or in addition to PET and injection stretch blow molding, respectively. Various materials and/or processes may be used to form package 5 and/or any component thereof as will be understood by one of ordinary skill in the art. In some embodiments, container 10 may be substantially a one-piece design and/or substantially formed as an integral or unitary structure.

These and other modifications and variations may be practiced by those of ordinary skill in the art without departing from the spirit and scope, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the scope of that which is described in the claims. Therefore, the spirit and scope of the appended claims should not be limited to the exemplary description of the versions contained herein.

That which is claimed:

1. A child resistant pump closure combination, comprising:

a pump configured to dispense product, the pump extending in a first direction from a pump inlet to a dispensing outlet;

a closure configured to enclose the dispensing outlet of the pump, the closure having a cover and a side wall blocking access to the pump when the closure is in a closed position;

wherein the closure side wall depends from the closure cover, the closure cover and closure side wall define a closure interior, and the pump extends in the first direction into the closure interior when the closure is in the closed position;

a collar disposed around the pump and disposed in the first direction between the dispensing outlet and the pump inlet;

wherein the closure includes at least one locking tab and the collar includes at least one blocking tab and at least one slot, wherein the at least one slot is configured to allow axial movement of the at least one locking tab through it when the closure is in an unlocked position and the at least one blocking tab is configured to block axial movement of the at least one locking tab past it in the first direction when the closure is in a locked position;

wherein the closure is movable relative to the collar by a first user input between the locked position and the unlocked position;

wherein the closure is movable relative to the collar in the first direction by a second user input from the closed position to an open position when the closure is in the unlocked position, and movement of the closure by the second user input from the closed position to the open position is substantially blocked when in the locked position;

wherein the closure side wall includes at least one flute; and at least one tab opening formed in a lower end of the at least one flute, wherein the at least one tab opening is disposed adjacent and in alignment with the at least one locking tab.

2. The child resistant pump closure combination of claim 1, wherein the closure is movable between the locked position and the unlocked position by rotation about an axis of the closure relative to the collar.

3. A package including the child resistant pump closure combination of claim 1, and further comprising a container having a side wall and a bottom, the side wall and bottom at least partially defining a product storage region.

4. The package of claim 3, wherein the container is configured to enclose the pump inlet.

5. A child resistant pump closure combination, comprising:

a pump configured to dispense product through a dispensing outlet, the pump extending in a first direction from a pump inlet to a dispensing outlet;

the pump configured to be actuated by a user to dispense product through the pump and the dispensing outlet;

a closure configured to enclose the dispensing outlet of the pump, the closure having a cover and a side wall blocking access to the pump when the closure is in a closed position;

wherein the closure side wall depends from the closure cover in a second direction opposite the first direction, the closure cover and closure side wall define a closure interior, and the pump extends in the first direction into the closure interior when the closure is in the closed position;

a collar disposed around the pump and spaced apart from the dispensing outlet in the second direction away from the closure cover when the closure is in the closed position;

wherein the closure includes a first locking tab;

wherein the collar includes at least one blocking tab, a first slot, and a second slot, wherein the first slot is configured to allow movement of the first locking tab through it in the first direction when the closure is in an unlocked position, wherein the second slot is configured to block movement of the first locking tab in the first direction;

wherein the at least one blocking tab is configured to block movement of the first locking tab past it in the first direction when the closure is in a locked position;

wherein the closure is movable relative to the collar by a first user input between the locked position and the unlocked position;

wherein the closure is movable relative to the collar by a second user input in the first direction from the closed position to an open position when the closure is in the unlocked position, and movement of the closure by the second user input from the closed position to the open position is substantially blocked when in the locked position; and wherein the first locking tab is configured such that it can pass in the first direction through the first slot but not the second slot.

6. The child resistant pump closure combination of claim 5, wherein the first locking tab has at least one of (a) a length that is greater than a length of the second slot and (b) a width that is greater than the width of the second slot.

7. The child resistant pump closure combination of claim 5, wherein the closure includes a second locking tab, wherein the second locking tab is configured such that it can pass in the first direction through the second slot when the closure is in the unlocked position.

8. The child resistant pump closure combination of claim 7, wherein the second locking tab is configured such that it can pass in the first direction through the second slot but not the first slot.

9. The child resistant pump closure combination of claim 8, wherein the first slot has a first slot shape, the second locking tab has a second tab shape, and the second slot has a second slot shape that is different than the first slot shape; and wherein the first slot shape and the second slot shape are configured such that the second tab can pass in the first direction through the second slot but not the first slot.

10. The child resistant pump closure combination of claim 7, further comprising a third locking tab on the closure and a third slot on the collar, wherein the third slot is configured to allow movement of the third locking tab through it in the first direction when the closure is in an unlocked position.

11. The child resistant pump closure combination of claim 10, wherein the third locking tab is configured such that it can pass in the first direction through the third slot but not the first slot.

12. The child resistant pump closure combination of claim 11, wherein the third locking tab is configured such that it can pass in the first direction through the third slot but not the second slot.

13. The child resistant pump closure combination of claim 10, wherein the first slot is spaced apart from the second slot by about 120 degrees, and the second slot is spaced apart from the third slot by about 120 degrees.

14. The child resistant pump closure combination of claim 5, further comprising an unlocked indicium on at least one of the closure and the collar, wherein the unlocked indicium is configured to indicate when the closure is in the unlocked position.

* * * * *